(12) United States Patent
Sugano et al.

(10) Patent No.: US 8,097,205 B2
(45) Date of Patent: Jan. 17, 2012

(54) CONTINUOUS ANNEALING EQUIPMENT

(75) Inventors: Takahiro Sugano, Chiba (JP); Eiko Yasuhara, Chiba (JP); Takashi Yamauchi, Chiba (JP)

(73) Assignee: JFE Steel Corporation (JP)

( * ) Notice: Subject to any disclaimer, the term of this patent is extended or adjusted under 35 U.S.C. 154(b) by 287 days.

(21) Appl. No.: 12/521,007

(22) PCT Filed: Feb. 14, 2008

(86) PCT No.: PCT/JP2008/052919
§ 371 (c)(1),
(2), (4) Date: Jun. 24, 2009

(87) PCT Pub. No.: WO2008/099970
PCT Pub. Date: Aug. 21, 2008

(65) Prior Publication Data
US 2010/0044932 A1  Feb. 25, 2010

(30) Foreign Application Priority Data
Feb. 14, 2007  (JP) .................. 2007-032859

(51) Int. Cl.
*C21D 9/573* (2006.01)
(52) U.S. Cl. ....................... 266/103; 266/102

(58) Field of Classification Search ............. 266/102, 266/103
See application file for complete search history.

(56) References Cited

U.S. PATENT DOCUMENTS
6,190,164 B1  2/2001 Ueno et al.
6,437,301 B1 * 8/2002 Kitano et al. ............. 219/619

FOREIGN PATENT DOCUMENTS
| JP | 63-174791 A | 7/1988 |
| JP | 06-179955 A | 6/1994 |
| JP | 09-041045 A | 2/1997 |
| JP | 11-335744 A | 12/1999 |
| JP | 2002-241845 A | 8/2002 |
| JP | 2004-339553 A | 12/2004 |
| JP | 2005-113244 A | 4/2005 |

* cited by examiner

*Primary Examiner* — Scott Kastler
(74) *Attorney, Agent, or Firm* — DLA Piper LLP (US)

(57) ABSTRACT

Continuous annealing equipment contains: a heating zone, a soaking zone, and a rapid cooling zone, the rapid cooling zone having gas jet cooling equipment and is provided with at least one pair of seal rolls at each of an inlet and an outlet thereof and bridle roll units each composed of two or more bridle rolls in front of and behind itself; the bridle roll unit behind the rapid cooling zone having two or more heating rolls each having an induction heater thereinside; and the heating roll having a winding angle of 100° or more per heating roll and 380° or more in total of all the heating rolls.

4 Claims, 4 Drawing Sheets

CONTINUOUS ANNEALING EQUIPMENT

RELATED APPLICATIONS

This is a §371 of International Application No. PCT/2008/052919, with an international filing date of Feb. 14, 2008 (WO 2008/099970 A1, published Aug. 1, 2008), which is based on Japanese Patent Application No. 2007-032859, filed Feb. 14, 2007.

TECHNICAL FIELD

This disclosure relates to continuous annealing equipment, and particularly to continuous annealing equipment capable of continuously annealing a steel strip, and then equalizing a temperature distribution along the widthwise or transverse direction of the steel strip after rapid cooling with gas jet cooling equipment.

BACKGROUND

In general, a cold rolled steel sheet, a galvanized steel sheet, and a galvannealed steel sheet which are used as an exterior panel material and the like of automobiles are manufactured by heating a steel strip serving as a raw material with a continuous annealing furnace, cooling the resultant, or, after the heat treatment, guiding the resultant to a molten zinc bath for hot dip galvanizing, and controlling the adhesion amount to a given amount, or, thereafter, further guiding the resultant to an galvannealing furnace by gas heating, induction heating, etc., for galvannealing treatment in which iron is thermally diffused into a plating layer, and then subjecting the resultant to temper rolling.

The continuous annealing furnace used for manufacturing a steel sheet containing a heating zone and a soaking zone in which a steel strip is heated to a predetermined temperature for annealing treatment and a cooling zone in which the high temperature steel strip is cooled to room temperature or a given temperature. In some cases, the rapid cooling zone contains, in addition to the case of containing a usual cooling zone alone, a rapid cooling zone and a slow cooling zone or a rapid cooling zone and an overaging treatment zone or the like.

In contrast, a steel sheet for automobiles has been becoming increasingly wide with an increase in size of automobiles. From the viewpoint of securing safety, an increase in strength of a steel sheet for automobiles has been advanced. Moreover, from the viewpoint of protecting the global environment, a steel sheet for automobiles has been becoming increasingly reduced in thickness to reduce the weight of a car body. As a result, in a continuous annealing furnace, the annealing temperature increases with the employment of a high strength material. The increase in annealing temperature reduces high temperature strength of a steel strip, resulting in a tendency that threading properties of the steel sheet deteriorate. Furthermore, due to the abovementioned broadening and thickness reduction of a steel strip, it is becoming difficult to maintain stable operation of a continuous annealing furnace with a conventional continuous annealing technique.

In recent years, by positively utilizing a material control technique of rapidly cooling a high temperature steel strip in a continuous annealing furnace, development of a product having both formability and strength has been vigorously performed. As an example thereof, a bake-hardening steel sheet (a so-called "BH steel sheet") used for car bodies is mentioned.

As a rapid cooling technique applied to manufacturing of the steel sheet, techniques, such as a gas jet cooling system including spraying cooling gas, which is obtained by cooling atmospheric gas with a heat exchanger, onto a steel strip as high-speed gas jet flow and a roll cooling system including pouring a cooling medium into a roll to cool the roll, and pressing the cooled roll against a steel strip to cool the steel strip, are known.

Among the above, the gas jet cooling system has advantages that the appearance and shape of a steel strip after cooling are relatively favorable and that cooling equipment are also relatively inexpensive but has a disadvantage that a cooling rate is low, compared with other cooling methods. Then, to compensate for the disadvantage, the flow rate of coolant gas has been increased or the distance between a gas jet nozzle and a steel strip has been reduced to increase the heat transfer rate.

However, increasing a cooling gas jet flow rate or reducing the distance between a gas jet nozzle and a steel strip are effective for increasing the heat transfer rate, but there arises a problem that, when cooling gas hits the steel strip surface, a steel strip edge is excessively cooled, promoting temperature non-uniformity along the widthwise or transverse direction of the steel strip. Furthermore, in manufacturing a bake-hardening steel sheet, there arises a problem that a defect referred to as a stretcher strain or a wrinkle pattern may occur due to the temperature non-uniformity along the widthwise or transverse direction of a steel strip. Furthermore, it has been desired to control the temperature and the cooling rate in a continuous annealing furnace with higher precision with tightening of quality requirements in a steel sheet for automobiles.

Then, some techniques of reducing the temperature non-uniformity along the widthwise or transverse direction of a steel strip have been proposed. For example, Japanese Patent Application Laid-Open No. 06-179955 discloses a technique of disposing an induction heater at a forward part or a rear part of a rapid cooling zone of an annealing furnace having a deoxidation furnace. Japanese Patent Application Laid-Open No. 2004-339553 discloses a technique of disposing an induction heater at a rear part of a cooling furnace for induction heating. Furthermore, Japanese Patent Application Laid-Open No. 2005-113244 discloses a technique of disposing, at a stage prior to a molten zinc bath, an edge heating roll having a plurality of induction heating coils for heating the end of a steel sheet.

However, according to the method disclosed in Japanese Patent Application Laid-Open No. 06-179955, an induction heater is disposed at a rear part of a cooling zone of a horizontal type furnace and, according to the method disclosed in Japanese Patent Application Laid-Open No. 2004-339553, an induction heater is disposed at a rear part of a cooling zone of a vertical type furnace. Thus, in the case of a steel strip having a wide width and a thin thickness, catenary or cross bow of a steel strip is noticeable and when the shape of a steel strip is bad, contact between a heating coil of an induction heater and a steel strip easily occurs. Therefore, there is a possibility that troubles, such as a spark or water leakage from a heating coil cooling unit due to the spark, occur or a steel strip brakes. According to the method disclosed in Japanese Patent Application Laid-Open No. 2005-113244, the winding angle of an edge heating roll described in Examples is about 120°. When a steel strip has a wide width, a thin thickness, and a bad shape, contact between a steel strip and a roll becomes insufficient, resulting in a failure of sufficiently obtaining the effects of an edge heating roller.

According to a method involving directly heating a steel strip from a heating coil with an induction heater disposed in an annealing furnace, repairing of the induction heating coil requires opening the furnace, resulting in that the furnace needs to stop over a long time. Furthermore, in high-rate gas jet cooling equipment having a heat transfer coefficient (α) per side of a steel strip of 170 W/m²/° C. or higher, cooling gas impinging on the surface of a steel strip flows out of a cooling zone to develop temperature non-uniformity along the widthwise or transverse direction of the steel strip in a hearth roll located at a position nearest to an inlet or an outlet of a rapid cooling zone, and promoting excessive cooling at an edge part of the steel strip behind the rapid cooling zone or temperature non-uniformity along the widthwise or transverse direction of the steel strip. The temperature non-uniformity along the widthwise or transverse direction of the steel strip results in non-uniformity in a dissolved carbon content along the widthwise or transverse direction of the steel strip, and further seriously affect the development of a stretcher strain or a wrinkle pattern of a bake-hardening steel sheet.

Thus, it could be helpful to provide continuous annealing equipment capable of eliminating temperature non-uniformity along the widthwise or transverse direction of a steel strip at an exit side of a rapid cooling zone having gas jet cooling equipment and preventing the development of a stretcher strain or a wrinkle pattern of a bake-hardening steel sheet.

SUMMARY

We found that the above-described problems can be solved by disposing a bridle roll unit composed of two or more heating rolls each having an induction heater thereinside behind a rapid cooling zone having gas jet cooling equipment for continuous annealing equipment.

We, thus, discovered continuous annealing equipment for steel sheets, at least having a heating zone, a soaking zone, and a rapid cooling zone. The rapid cooling zone has gas jet cooling equipment, at least one pair of seal rolls at each of an inlet and an outlet thereof, and bridle roll units each composed of two or more bridle rolls in front of and behind itself; the bridle roll unit behind the rapid cooling zone has two or more heating rolls each having an induction heater thereinside; and the winding angle of the heating roll is 100° or more per heating roll and 380° or more in total of all the heating rolls.

The continuous annealing equipment is either one of equipment for manufacturing a cold rolled steel sheet, equipment for manufacturing a galvanized steel sheet, or equipment for manufacturing a galvannealed steel sheet.

A temperature distribution along the widthwise or transverse direction of a steel strip at an exit side of a rapid cooling zone of a continuous annealing furnace which continuously heats a steel sheet in succession can be established. Thus, the development of a stretcher strain or a wrinkle pattern in a bake-hardening steel sheet can be effectively prevented, making it possible to enormously contribute to the improvement in quality or yield of a steel sheet. Furthermore, operation troubles in continuous annealing equipment are overcome, allowing stable operation.

REFERENCE NUMERALS

Figure 1:
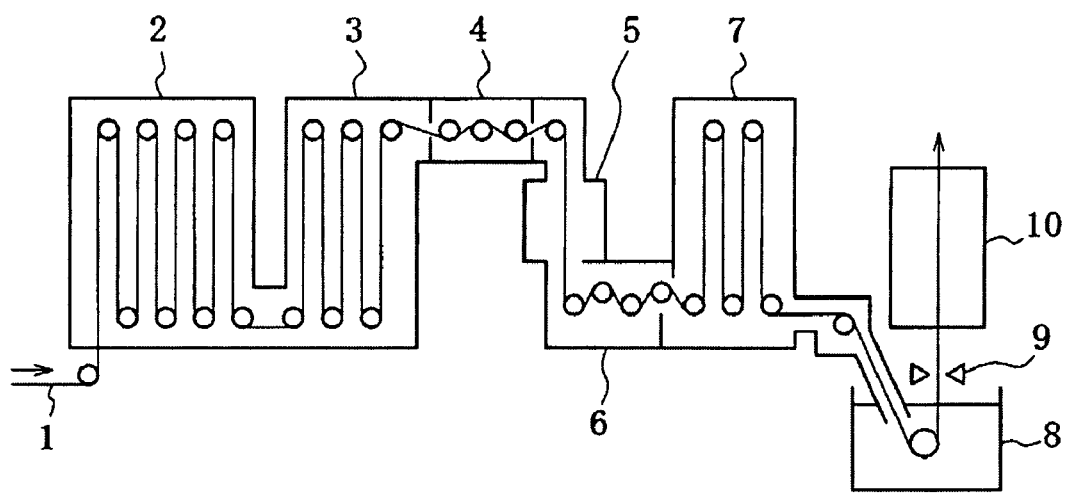
FIG. 1 is a view illustrating equipment for manufacturing a galvannealed steel sheet.

The reference numerals of the drawings are as follows:

| | |
|---|---|
| 1 | Steel strip |
| 2 | Heating zone |
| 3 | Soaking zone |
| 4 | Bridle roll unit chamber before rapid cooling zone |
| 5 | Rapid cooling zone (First cooling zone) |
| 6 | Bridle roll unit chamber behind rapid cooling zone |
| 7 | Cooling zone (Second cooling zone) |
| 8 | Molten zinc bath |
| 9 | Zinc coating weight controller |
| 10 | Galvannealing furnace |
| 11 | Heat transmission heater |
| 12 | Bridle roll unit before rapid cooling zone |
| 12a | Bridle roll in bridle roll unit before rapid cooling zone |
| 13, 13' | Seal roll |
| 14 | Gas jet cooling unit |
| 15 | Radiation thermometer |
| 16 | Bridle roll unit behind rapid cooling zone |
| 16a | Bridle roll in bridle roll unit behind rapid cooling zone |
| 16b | Heating roll |
| 17 | Induction heater (Induction heating coil) |

DETAILED DESCRIPTION

Our continuous annealing equipment will be described with reference to a representative example of equipment for manufacturing a galvannealed steel sheet.

FIG. 1 is a view illustrating equipment for manufacturing a galvannealed steel sheet equipped with the continuous annealing equipment. FIG. 1 includes a steel strip 1, a heating zone 2, a soaking zone 3, bridle roll unit chambers 4 and 6, a rapid cooling zone 5, a cooling zone 7 (Slow cooling zone), a molten zinc bath 8, a Zinc coating weight controller 9, and an galvannealing furnace 10.

Figure 2:
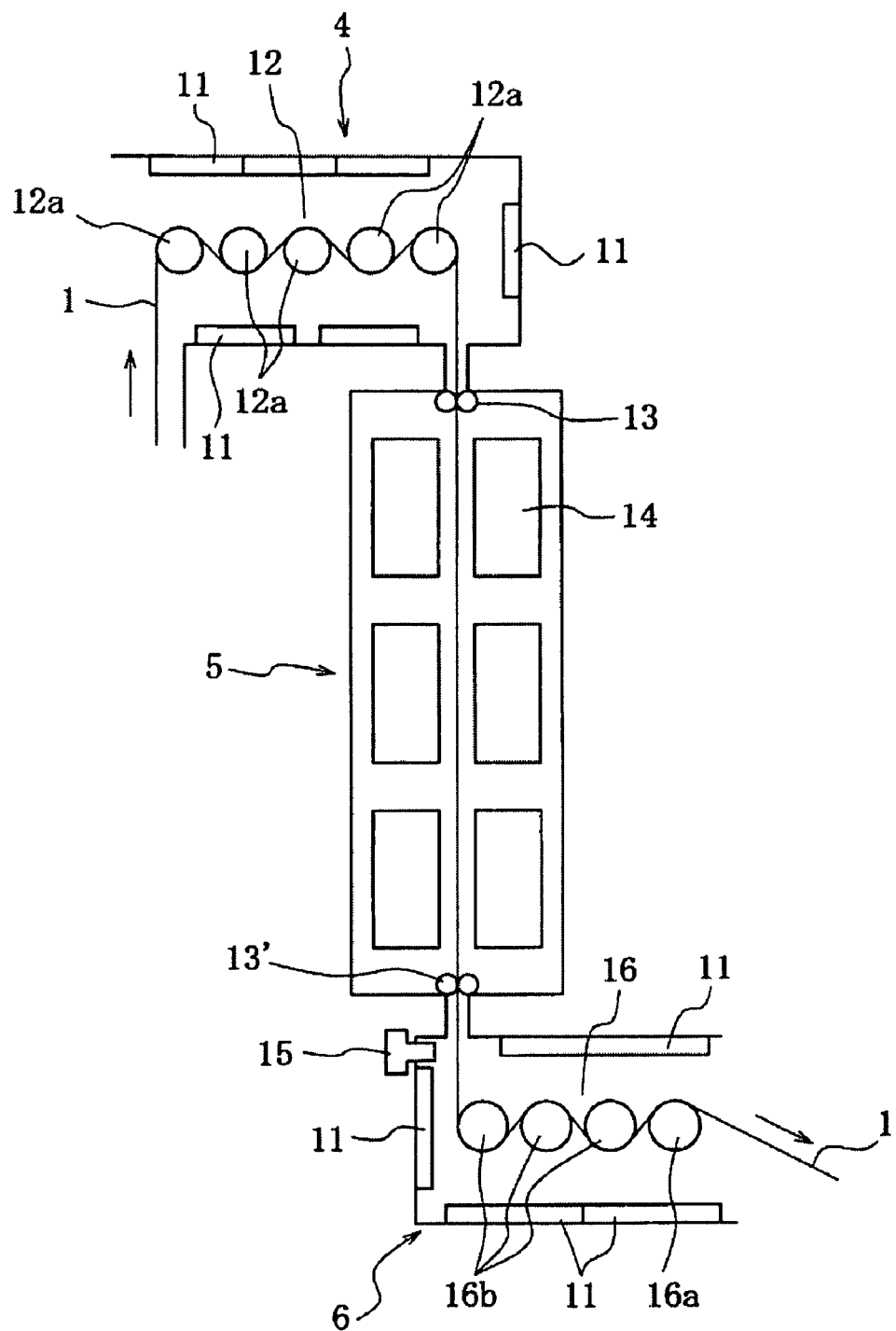
FIG. 2 is a view illustrating an example of the structure in front of and behind a rapid cooling zone of the manufacturing equipment shown in FIG. 1.

FIG. 2 is a view illustrating the rapid cooling zone 5 having gas jet cooling equipment 14 and a detailed structure in front of and behind itself in the continuous annealing equipment. The bridle roll unit chambers 4 and 6 in front of and behind the rapid cooling zone 5 are provided with bridle roll units 12 and 16, each composed of two or more bridle rolls for giving a desired target tension to the steel strip 1. To prevent cooling gas emitted from the gas jet cooling equipment 14 in the rapid cooling zone 5 from flowing out of the rapid cooling zone 5, the rapid cooling zone 5 is provided with seal rolls 13 and 13' at an inlet and an outlet thereof, respectively. The chambers 4 and 6 each accommodating the bridle roll units 12 and 16 in front of and behind the rapid cooling zone 5 are provided with a heat transmission heater 11 for preventing the bridle rolls from cooling. Furthermore, the bridle roll unit disposed behind the rapid cooling zone needs to have a heating roll provided with an induction heater thereinside so as to eliminate temperature non-uniformity along the widthwise or transverse direction of a steel strip.

Figure 3:
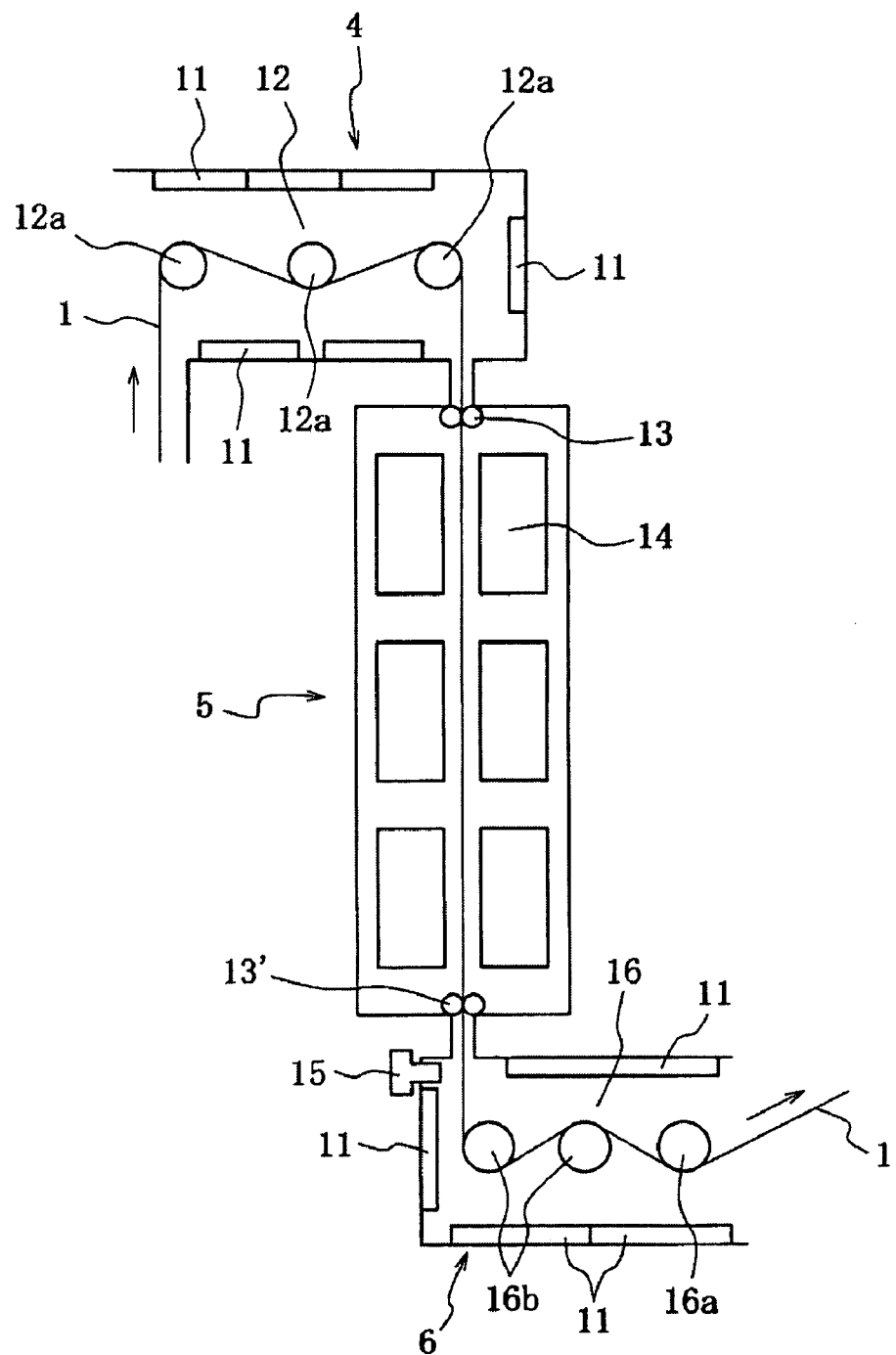
FIG. 3 is a view illustrating an example of another structure in front of and behind the rapid cooling zone of the manufacturing equipment shown in FIG. 1.

FIG. 2 shows an example in which the bridle roll unit 2 composed of five bridle rolls 12a is disposed before the rapid cooling zone; the bridle roll unit 16 composed of four bridle rolls 16a is disposed behind the rapid cooling zone; and three bridle rolls 16a from the side near the rapid cooling zone are used as the heating rolls 16b. However, our equipment is not limited to the above example, and may have structures such that, as shown in FIG. 3, for example, the bridle roll units 12 and 16 each in front of and behind the rapid cooling zone are composed of three bridle rolls, and two bridle rolls near the rapid cooling zone of the bridle roll behind the rapid cooling zone are used as the heating rolls 16b. More specifically, the number of the bridle rolls or the heating rolls may be two, and another structure (arrangement) different from that of FIG. 2 or FIG. 3 is acceptable insofar as desired tension can be applied to the steel strip 1 of the rapid cooling zone 5 and a temperature distribution along the widthwise or transverse direction of the steel strip behind the rapid cooling zone can be equalized.

Next, one mode of operation of the continuous annealing furnace will be described. As shown in FIG. 2, the steel strip 1 is conveyed from the soaking zone 3 to the bridle roll unit chamber 4 in the direction of the arrows in FIG. 2, wound around the bridle roll unit 12, conveyed to the rapid cooling zone 5, and thereafter, threaded in such a manner as to be wound over onto the bridle roll unit 16. During the process, the steel strip 1 is conveyed with desired tension in the rapid cooling zone 5 by the bridle roll units 12 and 13, and simultaneously therewith, equalization of temperature distribution along the widthwise or transverse direction of the steel strip is achieved by the bridle roll unit 16 behind the rapid cooling zone having the heating roll 16b which has been heated beforehand with the induction heater inside the roll.

In the continuous annealing equipment, each of the inlet and outlet of the rapid cooling zone needs to be provided with at least one pair of seal rolls. This is because cooling gas emitted from the gas jet cooling equipment for the rapid cooling zone impinges the steel strip surface, passes through the inlet and outlet of the rapid cooling zone, i.e., a connection part between the rapid cooling zone and each of the bridle roll unit chambers provided in front of and behind the rapid cooling zone, flows into the bridle roll unit chambers in a large amount, and excessively cools the edge part of the bridle roll disposed in the vicinity of the connection part. As a result, a temperature difference along the widthwise or transverse direction of the steel strip of the bridle rolls develops. Furthermore, the temperature non-uniformity causes cooling rate non-uniformity of the rapid cooling zone, and further causes fluctuation of the amount of the dissolved carbon content along the widthwise or transverse direction of the steel strip, resulting in the development of a stretcher strain or wrinkle pattern of a steel strip product. In particular, when the steel strip thickness is small, a stretcher strain or a wrinkle pattern occurs at significant frequencies.

The above-described bridle roll unit composed of at least two or more bridle rolls disposed behind the rapid cooling zone has the actions of giving desired tension to the steel strip in the rapid cooling zone and improving temperature uniformity along the widthwise or transverse direction of the steel strip by means of the heating roll of the unit. Among the above, the temperature equalization effect along the widthwise or transverse direction of the steel strip is greatly influenced by the winding properties of the steel strip to the bridle roll, especially the heating roll 16b. Then, we discovered that, to obtain the temperature equalization effect, the winding angle of the steel strip relative to the heating roll 16b having an induction heater thereinside needs to be adjusted to 100° or more per heating roll and to 380° or more in total of all the heating rolls.

The bridle roll unit 16 behind the rapid cooling zone may have a structure in which the bridle rolls required for achieving target temperature equalization of a steel strip are used as the heating rolls each having an induction heater thereinside and the remaining bridle rolls are used as usual bridle rolls or a structure in which all of the bridle rolls are used as the heating rolls each having an induction heater thereinside, and the rolls can be switched ON and OFF as required. However, in either case, the rolls which are subjected to induction heating for use are preferably rolls near the rapid cooling zone.

Figure 4:
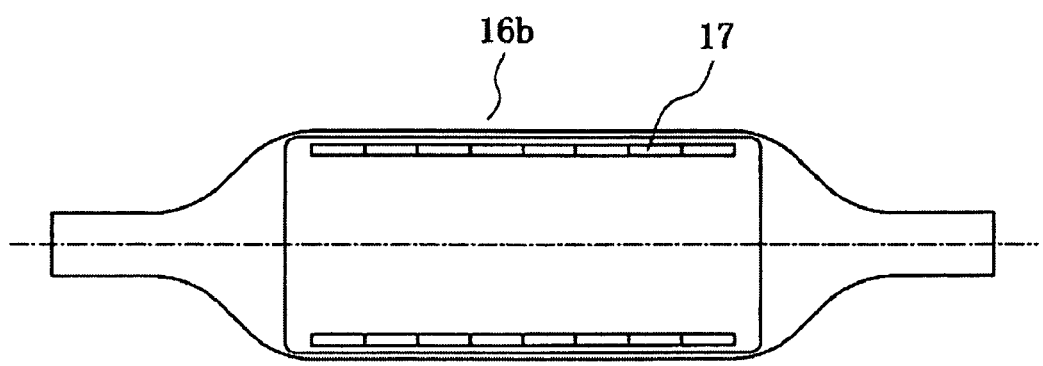
FIG. 4 is a view illustrating the internal structure of a heating roll equipped with an induction heater.

FIG. 4 illustrates an example of the heating roll in which an induction heating coil 17 divided into eight pieces by a widthwise or transverse of about 150 to 300 mm is disposed inside the roll. It is preferable that the induction heating coil have a heating capacity of 10 to 30 kW per 100 mm width. Further, it is preferable that the induction heating coil be structured so that heating or non-heating can be selected and a heating output can be controlled in accordance with a temperature distribution along the widthwise or transverse direction of a steel strip.

Any continuous annealing equipment may be used as the continuous annealing equipment insofar as the above-described requirements are satisfied, and may be, for example, equipment for manufacturing a cold rolled steel sheet or equipment for manufacturing a galvanized steel sheet besides the equipment for manufacturing a galvannealed steel sheet described above.

EXAMPLES

A cold-rolled steel strip containing 0.0005 to 0.0025 mass % of C and 0.005 to 0.025 mass % of Nb and having a thickness of 0.65 mm and a width of 1820 mm was threaded in a galvannealing line having the continuous annealing equipment shown in FIGS. 1 and 2, annealed at 820 to 880° C. for 2 to 4 seconds, rapidly cooled to 500 to 550° C. by gas jet cooling equipment having a heat transfer coefficient ($\alpha$) per side of 280 W/m$^2$/° C., gradually cooled, galvanized, and alloyed to manufacture a galvannealed steel sheet having a coating weight of 45 g/m$^2$ (per side). During the process, the threading conditions (the number of used heating rolls, the winding angle of each heating roll, and the total winding angle of all the heating rolls) of the bridle roll behind the rapid cooling zone were changed as shown in Table 1, while changing the number of used heating rolls by switching the induction heater ON and OFF or changing the winding angle by changing the arrangement of the heating rolls. The output in the widthwise or transverse direction of the heating rolls was equalized to be 200 kW per heating roll.

A sample was taken from each galvannealed steel sheet thus obtained. Then, 5 test pieces 300 mm square were cut out from each sample along the widthwise or transverse direction under the respective conditions. Subsequently, the test pieces were subjected to pressed deformation amount of 3%. A wrinkle pattern developed on the surface was visually observed. Then, evaluation was performed according to the following criteria: ○: No wrinkle pattern was observed in each of the five test pieces; Δ: A slight wrinkle pattern was observed therein; ×: A noticeable wrinkle pattern was observed therein. The evaluation results were shown in Table 1. At the exit side of the bridle roll unit behind the rapid cooling zone, the temperatures at 50 mm positions from the central part and the endmost parts along the widthwise or transverse direction of the steel strip were measured using a radiation thermometer, and the average of a temperature difference between the both ends and the central part was calculated from the value. The results were also shown in Table 1.

TABLE 1

| No. | Number of heating rolls (pieces)* | Winding angle of each heating roll (° C.) | Winding angle of all heating rolls (° C.) | Temperature difference along widthwise or transverse direction of steel strip | Evaluation of wrinkle pattern | Remarks |
|---|---|---|---|---|---|---|
| 1 | 1*1 | 90 | 90 | 15 | X | Com. Ex. |
| 2 | 1*1 | 100 | 100 | 12 | X | Com. Ex. |
| 3 | 1*1 | 120 | 120 | 10 | X | Com. Ex. |
| 4 | 1*1 | 180 | 180 | 8 | X | Com. Ex. |
| 5 | 2*2 | 120 | 240 | 6 | Δ | Com. Ex. |
| 6 | 3*3 | 127 | 380 | 3 | ○ | Ex. |
| 7 | 3*3 | 147 | 446 | 2 | ○ | Ex. |
| 8 | 4*4 | 150 | 600 | 1 | ○ | Ex. |

*1 Among 4 bridle rolls, one bridle roll nearest to the rapid zone was used as a heating roll.
*2 Among 4 bridle rolls, two bridle rolls near the rapid zone were used as heating rolls.
*3 Among 4 bridle rolls, three bridle rolls near the rapid zone were used as heating rolls.
*4 All 4 bridle rolls were used as heating rolls.

Table 1 shows that, when the winding angle of each heating roll is 100° or more and the total winding angle of all the heating rolls is 380° or more, the temperature difference along the widthwise or transverse direction of the steel strip can be adjusted to be within 3° C., and the development of a wrinkle pattern in a steel strip product can be prevented.

INDUSTRIAL APPLICABILITY

Our techniques are also applicable to an annealing furnace for metal strips other than a steel strip.

The invention claimed is:

1. Continuous annealing equipment for a steel sheet comprising:
a heating zone,
a soaking zone, and
a rapid cooling zone comprising:
gas jet cooling equipment, at least one pair of seal rolls at each of an inlet and an outlet thereof, and bridle roll units each composed of two or more bridle rolls in front of and behind one another;
the bridle roll unit behind the rapid cooling zone having two or more heating rolls each having an induction heater thereinside; and
the heating roll having a winding angle of 100° or more per heating roll and 380° or more in total of all the heating rolls.

2. The continuous annealing equipment according to claim 1, further comprising equipment for manufacturing a cold rolled steel sheet.

3. The continuous annealing equipment according to claim 1, further comprising equipment for manufacturing a galvanized steel sheet.

4. The continuous annealing equipment according to claim 1, further comprising equipment for manufacturing a galvannealed steel sheet.

* * * * *